INVENTOR.
FRANK P. KOKESH

May 7, 1963 F. P. KOKESH 3,088,540
ACOUSTIC VELOCITY LOGGING SYSTEM
Filed Sept. 21, 1959 3 Sheets-Sheet 2

INVENTOR.
FRANK P. KOKESH
BY
*his* ATTORNEYS

May 7, 1963  F. P. KOKESH  3,088,540
ACOUSTIC VELOCITY LOGGING SYSTEM
Filed Sept. 21, 1959  3 Sheets-Sheet 3

INVENTOR.
FRANK P. KOKESH
BY
his ATTORNEYS

United States Patent Office 3,088,540
Patented May 7, 1963

3,088,540
ACOUSTIC VELOCITY LOGGING SYSTEM
Frank P. Kokesh, Houston, Tex., assignor to Schlumberger Well Surveying Corporation, Houston, Tex., a corporation of Texas
Filed Sept. 21, 1959, Ser. No. 841,267
10 Claims. (Cl. 181—.5)

This invention relates to an acoustic well logging apparatus and, more particularly, to an apparatus for determining the velocity of propagation of acoustic waves in the earth formations surrounding a bore.

Systems for determining the acoustic wave velocity in earth formations are well known in the art. Conventional systems are generally made up of a transmitter and two receivers mounted in longitudinally spaced apart relation on a support which is lowered into a bore. Once the travel time $\Delta t$ required for an acoustic wave to travel through the earth formations between the receivers is obtained, the velocity of the waves traveling through the formations between the two receivers can be determined since the span between the two receivers is known.

Usually, the transmitter is spaced three feet from the first receiver and a span of three feet is employed between the two receivers. Sometimes, however, with this spacing between the transmitter and the first receiver, inaccuracies arise due to the effect of formation alteration or heaving, adjacent the borehole. It has been found that if this distance is increased to six feet or more, the inaccuracies produced by this effect are reduced and sometimes eliminated. However, this remedy requires that the overall length of the logging apparatus be increased, which is equally undesirable, unless the span between the two receivers be decreased. A span as short as one foot between the two receivers has been employed but usually a short span is disadvantageous because it produces excessive detail and disturbing hole size effects. To gain both the advantages of a short span and a long span between the receivers, it has been proposed to provide more than two receivers spaced at varying distances from the transmitter. This remedy, however, in addition to requiring an excessively long logging tool, also requires a complicated switching system.

To obviate these difficulties, it is proposed to provide a logging apparatus employing only two receivers having a short span wherein the spacing from the transmitter to the first receiver is great enough to substantially eliminate the effects of formation alteration and wherein is achieved the same effect as obtains when the span between the two receivers is selectively varied to provide either a travel time measurement based on a short span, a long span or any desired span therebetween. This is accomplished, in a representative embodiment of the invention, by providing a logging apparatus that includes a transmitter and two receivers adapted to be disposed in a bore, the two receivers being positioned a relatively short distance apart to provide a short span, and means for obtaining travel time measurements $\Delta t$ for equal depth intervals in the bore. At the surface of the earth the travel time measurements are stored on a memory means which is adapted to be moved in accordance with the movement of the logging apparatus in the bore. A plurality of detecting means are operatively associated with the memory means and pick-up stored signals which are combined in a selected manner in order to produce a resultant indication representing a span greater than the actual span between the receivers.

In one embodiment of the invention, the memory means comprises a magnetic storage drum that is rotated at a rate proportional to the rate of travel of the logging apparatus in the bore. The time interval readings are recorded, preferably in binary form, on the storage drum and are subsequently picked up by detecting heads spaced at varying distances around the storage drum. By detecting a plurality of the stored readings simultaneously and adding them up, it is possible to obtain an indication of the wave travel time over a distance in the bore greater than the span between the two receivers.

In another embodiment of the invention, a plurality of capacitors are mounted on a rotating wheel and each of these capacitors is charged by an amount proportional to one time interval reading. By connecting these capacitors in series, the total voltage across a group of these capacitors is indicative of the total time required for an acoustic wave to travel a corresponding distance in the earth formations.

This invention may be better understood from the following detailed description taken in conjunction with the accompanying figures of the drawings, in which.

Figure 1:
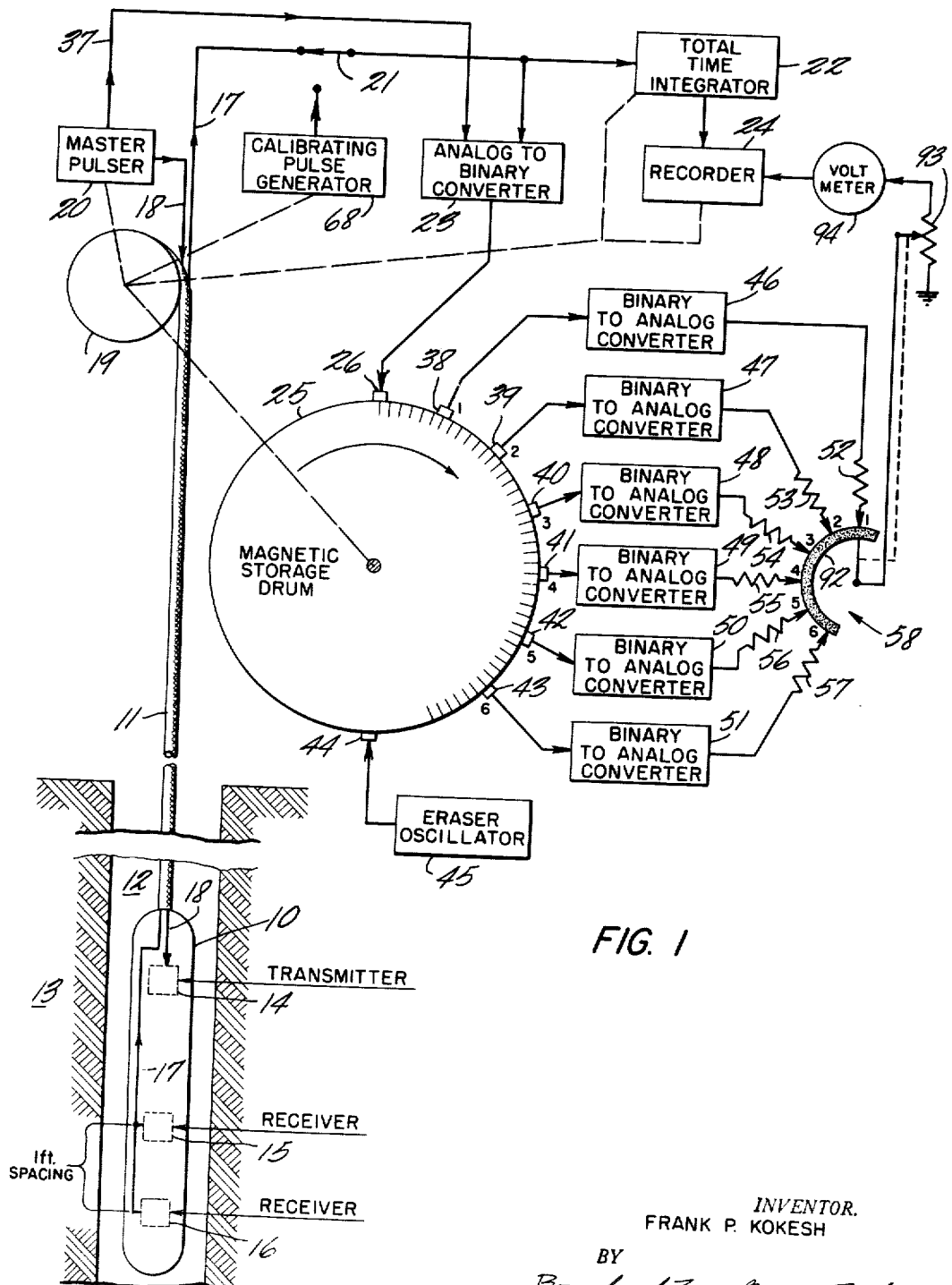
FIG. 1 is a schematic diagram of an acoustic well logging apparatus constructed in accordance with one embodiment of the invention showing a section through the earth with the logging tool in place in a borehole therein.

The apparatus illustrated in FIG. 1 includes a support 10 carried by a cable 11 and disposed in a bore 12 surrounded by earth formations 13 and containing a column of liquid. The support 10 is adapted to be lowered and raised in the bore by a conventional winch (not shown) attached to the cable 11. Mounted in longitudinally spaced apart relation on the support 10 are a transmitter unit 14 and two receiver units 15 and 16.

The transmitter unit 14 includes a conventional trigger circuit such as a thyratron tube circuit and a transmitter that may be any one of the conventional types available which are adapted to generate an acoustic wave in the bore fluid in response to an electrical impulse. One of the types commonly used consists of a cylinder of magnetostrictive material which is encircled by a toroidal coil. When the coil is energized by an electrical impulse, the magnetostrictive cylinder changes its dimensions and generates an acoustic wave in the bore fluid. The receiver units 15 and 16 may be any one of the conventional types adapted to generate an electrical pulse in response to an acoustic wave. A preferred type is described in the copending application of Frank P. Kokesh, filed June 30, 1958, Serial No. 745,548, assigned to the present assignee. One type of receiver that may be employed by these units is similar to the above-described transmitter. Another type consists simply of a flexible diaphragm attached to a coil that generates an electrical pulse when the diaphragm vibrates. The transmitter unit 14 and the receiver units 15 and 16 are connected to an electrical apparatus at the surface of the ground by two electrical conductors 17 and 18 which are usually contained within the cable 11 and insulated therefrom.

At the surface of the ground, a measuring wheel 19 is maintained in frictional contact with the cable 11 and rotates an amount proportional to the movement of the support 10 in the bore. The measuring wheel 19 mechanically drives a master pulser 20 that generates an electrical pulse each time the support 10 travels a unit depth interval in the bore. Each master pulse is fed to the transmitter unit 14 and causes the transmitter to generate an acoustic wave that travels through the fluid filling the bore to the earth formations and then back through the bore fluid to the receivers contained in the units 15 and 16.

When an acoustic wave successively intercepts the receivers, the units 15 and 16 generate electrical pulses which are carried to the surface of the ground by the conductor 17 and, when a switch 21 is closed, provide inputs to a total time integrator 22 and an analog to binary converter 23. The total time integrator 22 may be of the type described in the copending application of Robert B. Blizard, filed September 21, 1959, Serial No. 841,001, assigned to the present assignee, now U.S. Patent No. 3,006,347.

This total time integrator is adapted to receive a pair of spaced apart pulses from the receiver units and to measure the time interval between the pulses by means of a counter. The time intervals per foot of bore are integrated and fed into a recorder 24 which is driven by the measuring wheel 19 and which provides a log of the total acoustic wave travel time versus depth in the bore. The measuring wheel 19 is also connected to the total travel time integrator 22 for operating the integrator in synchronism with the master pulser 20.

Figure 2:
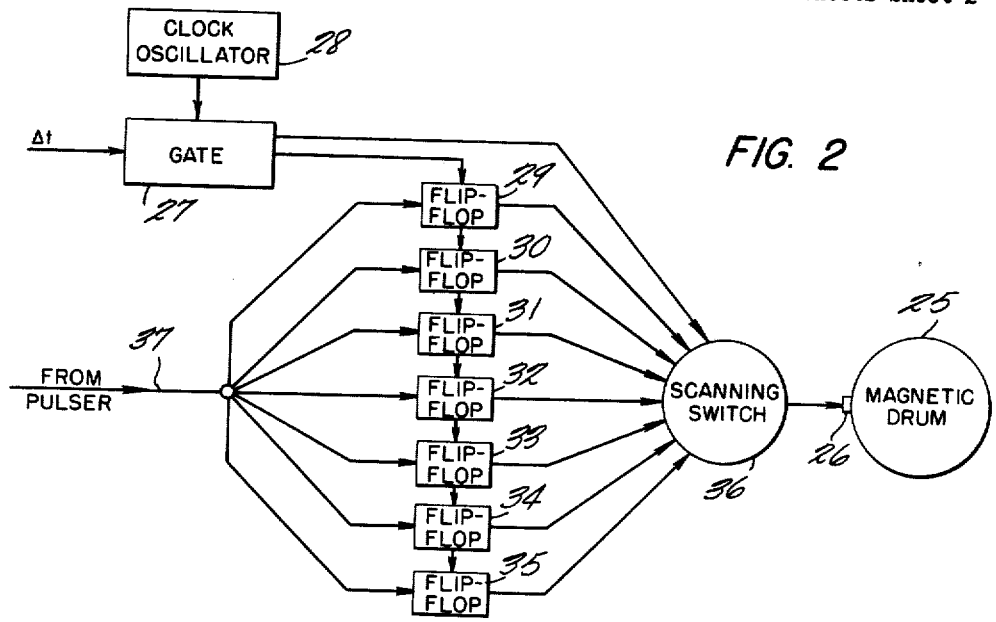
FIG. 2 is a schematic diagram of a typical analog to binary converter.

The analog to binary converter 23 receives the two spaced apart pulses from the receiver units 15 and 16 and provides a number, preferably coded in binary form, that indicates the length of time between the arrival of the two pulses. A converter that has been found suitable for this purpose is illustrated in FIG. 2 and includes a gate circuit 27 which is actuated by the pulses from the receivers and which allows pulses to pass from a clock oscillator 28 to a series of flip-flop circuits during the time interval $\Delta t$ between the pulses. A typical gate circuit 27 may include, for example, a bistable multivibrator that is connected to the input of a circuit that is normally biased below cutoff. The circuit is raised to the conduction point when the pulse from the receiver unit 15 activates the bistable multivibrator and generates a positive going voltage. Pulses from the oscillator 28 are then able to pass through the circuit until the pulse from the receiver 16 unit returns the bistable multivibrator to its former condition and closes the gate.

The pulses from the oscillator 28 actuate a plurality of series connected flip-flop circuits 29 to 35 which operate in a conventional manner. A first pulse from the oscillator 28 places the flip-flop circuit 29 in an "on" position; a second pulse places the flip-flop circuit 29 in an "off" position and the flip-flop circuit 30 in an "on" position; a third pulse places the flip-flop circuit 29 in an "on" position, the flip-flop circuit 30 in an "off" position and the flip-flop circuit 31 in an "on" position, etc. A group of seven flip-flop circuits connected in series as shown is able to count up to 128 pulses. The frequency of the oscillator 28 is chosen in relation to the number of master pulses per foot of cable travel so that less than this number of pulses will pass through the gate during the expected time interval $\Delta t$. Of course, if greater resolution is desired, an oscillator having a higher frequency and a greater number of flip-flop circuits could be employed.

When the pulse from the receiver 16 turns off the gate 27, it also energizes a scanning switch 36, FIG. 2. This may be accomplished, for example, by having the downgoing portion of the pulse produced by the bistable multivibrator in the gate circuit 27 trigger the driving circuit for the scanning switch. When the scanning switch 36 is energized, it senses the condition of each of the flip-flop circuits 29–35 and relays this information, in the form of a number, to the magnetic recording head 26 that impresses this number on the rotating magnetic storage drum 25. At the beginning of each time interval $\Delta t$ measurement, a pulse from the master pulser 20 is received along a conductor 37 and places the flip-flop circuits 29 to 35 in an "off" condition.

The numbers impressed on the rotating magnetic storage drum 25 by the recording head 26 then pass under a series of detecting heads 38 to 43 and an eraser head 44 which is connected to a conventional eraser oscillator 45. The detecting heads 38–43 pick up signals representing the previously recorded numbers and pass them to a plurality of binary to analog converters 46 to 51 which convert the signals to analog form prior to feeding them to a plurality of resistors 52 to 57 and a switch 58. The number representing signals are then erased from the drum 25 by the eraser head 44 so that new signals can be recorded.

Figure 3:
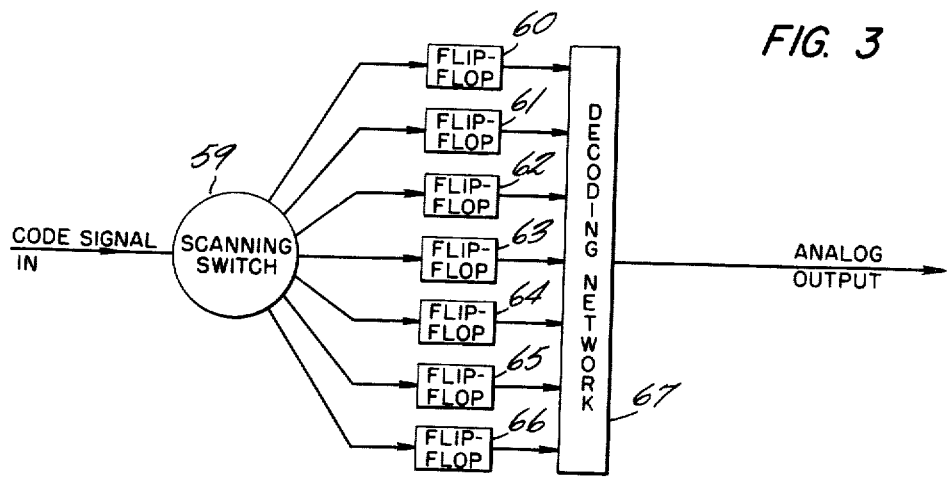
FIG. 3 is a schematic diagram of a typical binary to analog converter.

A binary to analog converter found suitable for the purposes of this invention is illustrated in FIG. 3. In general, the operation of this circuit is the reverse of the operation of the analog to binary converter 23 and is discussed on pages 5–30 of the book entitled "Notes on Analog-Digital Conversion Techniques," edited by Alfred Susskind and published by John Wiley and Sons, Inc. Briefly, the incoming signal is received by a scanning switch 59 which triggers selected ones of a plurality of flip-flop circuits 60–66 according to the received signal. A decoding circuit 67 senses the condition of the flip-flop circuits 60–66 and produces a D.C. voltage which is proportional to the signal which, in turn, is proportional to the time interval $\Delta t$ between the arrival of the pulses from the receiver units 15 and 16.

The outputs from the converters 46–51 are connected through the resistors 52–57 to the contacts "1"–"6," respectively, of the switch 58. A slider 92 on the switch 58 connects selected ones of the contacts "1"–"6" in parallel and to the arm of a potentiometer 93. A voltmeter 94 measures the voltage drop across the potentiometer 93 and has its output recorded by the recorder 24. The resistors 52–57 have a high ohmic resistance and the potentiometer 93 has a low ohmic resistance, the combination of these resistors making up a summing network. To explain the operation of this summing network, suppose that the slider 92 of the switch 58 is connected to the contacts "1" and "2." The parallel combination of the resistors 52 and 53 is then connected in series with the potentiometer 93. Voltages generated by the converters 46 and 47 will cause currents to flow through the resistors 52 and 53, the slider 92, the low impedance potentiometer 93 to ground. The current flowing through the potentiometer 93, therefore, is equal to the sum of the currents flowing through the resistors 52 and 53. The voltage drop across the potentiometer is proportional to the sum of the voltages generated by the converters 46 and 47 and is measured by the voltmeter 94 and recorded by the recorder 24. The slider 92 is mechanically coupled to the arm of the potentiometer 93 in such a manner that the resistance is decreased as the slider 92 connects more converters into the circuit. Therefore, the voltage drop across the potentiometer remains constant and the voltage readings are normalized to a "per foot" basis. The voltages generated by more than two of these converters can be summed up in a similar manner by properly positioning the slider 92.

In order to explain the operation of the entire well logging system illustrated in FIG. 1 in greater detail, assume that the receivers in the units 15 and 16 are spaced a distance of one foot apart and that the master pulser 20 generates a master pulse every time the support 10 travels two inches in the bore. Also assume that the recording head 26 and the detecting heads 38 to 43 are positioned around the magnetic storage drum 25 so that a point on the surface of the rotating drum will travel from one head to the next adjacent head during the time that the support 10 travels a distance of one foot in the bore. Since the transmitter will be triggered six times per foot, six time interval $\Delta t$ measurements will be recorded on the storage drum between adjacent heads. It should be understood that these parameters are illustrative only and that the invention is not limited in its use thereto.

As the support 10 moves through the bore, the transmitter in the unit 14 generates a series of acoustic waves which cause the receiver units 15 and 16 to generate pairs of electrical pulses as each wave successively intercepts the receivers in the units 15 and 16. These pulses are carried by the conductor 17 to the analog to binary converter 23 that provides a signal representing a number in binary form for each pair of pulses which represents the time interval $\Delta t$ between the two pulses. A recording head 26 then impresses this signal on the magnetic storage drum 25 as the drum rotates.

The detecting head 38 is positioned a distance from the recording head 26 which corresponds to one foot of travel of the support 10 in the bore; the detecting head 39 is positioned a distance from the head which corresponds to two feet of travel of the support 10, etc. If a measurement of the wave travel time is to be made over a distance in the bore corresponding to a one foot span, the slider 92 is positioned so that it makes contact with the switch contact "1." The voltage generated by the selected converter 46, which is proportional to a time interval $\Delta t$, causes a current to flow through the potentiometer 93, and the voltmeter 94 measures the voltage drop across the potentiometer. If the wave travel time is to be measured over a space of two or more feet, the number "1" and "2" switch contacts are connected in parallel. The voltages generated by adjacent converters 46 and 47, which represent the wave travel time over adjacent one foot spacings in the bore, are then added together and measured.

It can be seen, therefore, that the apparatus illustrated can provide a measurement of the acoustic wave travel time over a distance in the bore than can be varied from a one foot spacing to a six foot spacing between the two receivers. If desired, the wave velocity in the earth formations can also be obtained once the travel time is known since the span between the receivers is also known. While only a six foot span is shown it is apparent that greater spans may be employed.

A novel calibrating apparatus is also provided in the embodiment of the invention illustrated in FIG. 1. A calibrating pulse generator 68 is driven by the measuring wheel 19 and it generates a pair of pulses spaced in time equivalent to a precise distance apart at uniform depth intervals of the support 10 in the bore. These pulses are fed into the converter 23 by placing the switch 21 in the calibrating position. Since the time interval between the pulses is accurately known, the remainder of the system can be calibrated accordingly. When the logging tool is being moved through the bore, the magnetic storage drum 25 may be driven by the measuring wheel 19 and synthetic time intervals fed into the storage drum instead of the real time intervals. However, the storage drum and the calibrating pulse generator may be driven separately to simulate cable travel.

Figure 4:
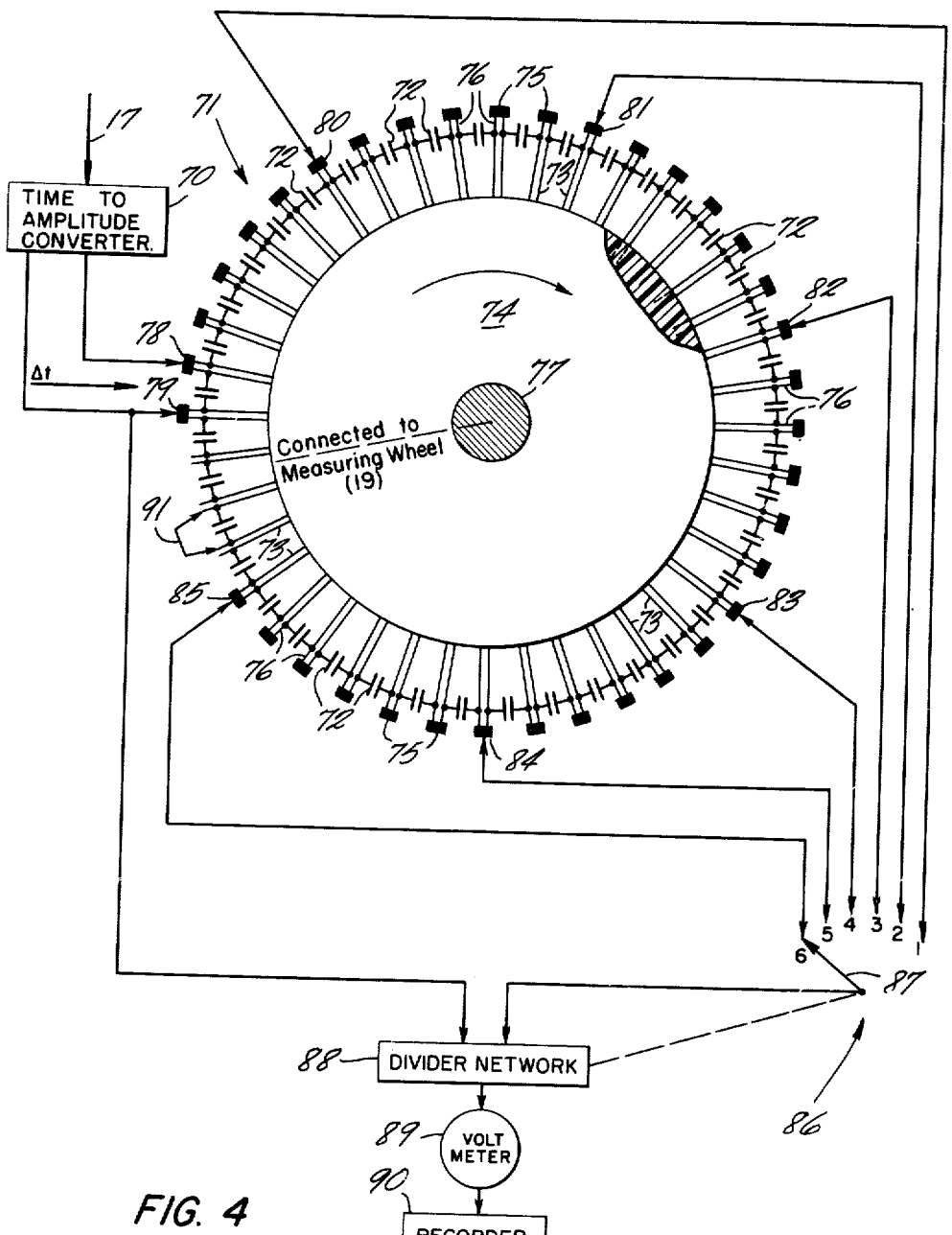
FIG. 4 is a schematic diagram in partial section of an acoustic well logging apparatus constructed in accordance with another embodiment of the invention.

FIG. 4 illustrates an alternative apparatus for indicating the acoustic wave travel time over varying distances in the bore. This alternative apparatus may be employed in place of the magnetic storage drum and the converter systems illustrated in FIGS. 1–3. The pulses from the receiver units 15 and 16 are carried by the conductor 17 to a time to amplitude converter 70 which converts the time interval between the pulses to a D.C. voltage that is proportional to the time interval. The converter 70 may include, for example, a bistable multivibrator that is placed in an "on" condition by the pulse received from the receiver unit 15 and is returned to an "off" condition by the pulse received from the receiver unit 16. The length of time the multivibrator is in the "on" condition, therefore, is proportional to the time interval $\Delta t$ between the two pulses. The output from the multivibrator is connected to a circuit that provides current at a constant rate for the length of time the multivibrator is in the "on" condition.

The output from the converter 70 is connected to the charging contacts 78 and 79 of a capacitor type memory storage drum 71. This storage drum includes a cylinder 74 of insulating material, a plurality of terminals 73 mounted thereon in insulated relation with respect to each other, and a plurality of capacitors 72 connected to the terminals 73 and positioned at equally spaced distances from each other around the cylinder 74. A plurality of stationary equally spaced connector contacts 75 are positioned so that a plurality of wipers 76, attached to the terminals 73, make contact with successive ones of the contacts 75 as the cylinder 74 rotates relative to the contacts 75. The cylinder 74 is mounted on a shaft 77 that is driven by the measuring wheel 19.

In the representative embodiment illustrated in FIG. 4, 40 capacitors are arranged on the storage drum. Assuming, once again for the sake of illustration, that an acoustic wave is generated at two inch intervals in the bore and that the cylinder 74 makes 1/40 of a revolution for each wave generated, the D.C. current from the converter 70 appearing at the pair of charging contacts 78 and 79 will charge successive capacitors 72 to values which are representative of the successive time intervals between the pulses from the receivers. Every sixth one of the connector contacts 75, designated respectively by the numerals 80–85, is connected to the contacts "1"–"6" of a switch 86.

In operation, for each acoustic wave generated, the converter 70 receives two pulses from the receiver units 15 and 16. The converter output consists of a D.C. current that is proportional to the time interval $\Delta t$ between these pulses. The rotation of the shaft 77 is synchronized with the master pulser 20 so that successive capacitors will be charged as they appear at the charging contacts 78 and 79 to amounts which are representative of the successive time intervals. To determine the acoustic wave travel time over a one foot spacing in the bore, the arm 87 of the switch 86 is turned to the number one position. The total charge on the six capacitors connected in series between the contacts 79 and 80 is then connected to the input of a divider network 88. Likewise, to determine the acoustic wave travel time for a spacing of from two to six feet in the bore, the arm 87 is set to the corresponding position on the switch 86. The divider network 88 has a movable control member mechanically coupled to the arm 87 of the switch 86 and will divide the input voltage by one if the arm 87 is at the one position, by two if the arm 87 is at the two position, etc. In this way, a reading is provided on a per foot basis regardless of the setting of the switch 86. In other words, if a long span is desired for correlation purposes, the switch 86 is set to position 6. The voltage across thirty-six capacitors is then connected to the input to the dividing network where it is divided by six to provide a per foot reading. On the other hand, if considerable detail is desired, the switch 86 is set to either position one or position two for a shorter span.

The output voltage from the divider network 88 is connected to a voltmeter 89 which provides an output to a recorder 90. The record advancing apparatus of the recorder 90 is mechanically coupled to the measuring wheel 19 and provides a permanent log of the acoustic wave travel time versus depth in the bore. The voltmeter 89 is preferably calibrated directly in travel time. This calibration should take into account the fact that six measurements are made for each foot of bore and that the sum of these six measurements appears at the contacts of the switch 86.

In order to discharge the capacitors prior to recharging them, a stationary conductor 91 is positioned so that it will sweep across the wipers 76. The resistance of the conductor 91 should be set at the proper value for most effectively discharging the capacitors.

It might be desirable, especially at low recording speeds, to run the entire capacitor storage drum in an oil bath to reduce the leakage problem and at the same time to improve the lubrication of the parts.

In both of the embodiments of the invention illustrated, a system of the type described in the previously mentioned copending application of Robert B. Blizard may be employed for shaping and amplifying the pulses from the receivers and for making the systems substantially insensitive to noise signals.

While not shown, it will also be appreciated that the travel time Δt may be obtained in response to a free running pulsed transmitter, the travel time being sampled per foot of cable travel as disclosed in the aforesaid Blizard application.

It can be seen, therefore, that a novel and useful acoustic well logging apparatus has been provided. This apparatus is able, with a short span between the receivers, to provide a measurement of the acoustic wave travel time over a distance which is many times the span between the receivers. Another important advantage of this apparatus is the fact that the distance over which the measurement is being made may be varied without using multiple receivers and complicated switching systems. A still further important advantage of the invention is the short span between the two receivers which allows the distance from the transmitter to the first receiver to be increased without increasing the overall length of the logging tool. As previously stated, this increased distance is important because it substantially eliminates the effects of formation alteration.

While particular embodiments of the invention have been shown and described for purposes of illustration, it is apparent that changes and modifications may be made without departing from this invention in its broader aspects. Therefore, the invention described herein is not to be construed as limited to the specific embodiments described but is intended to encompass all modifications thereof coming within the scope of the following claims.

I claim:

1. An apparatus for measuring the acoustic wave travel time in the earth formations surrounding a bore comprising a support adapted to be lowered into said bore, at least one acoustic wave transmitter and two acoustic wave receivers mounted in longitudinally spaced apart relation on said support, means connected to said transmitter for energizing said transmitter at equal depth intervals in said bore, said transmitter being adapted to generate an acoustic wave in said earth formations upon energization which reaches said receivers in succession, signal storage means synchronized with said energizing means, means coupled to said receivers for impressing a series of signals on said storage means as said receivers are passed along the bore, each of said signals being representative of the time required for an acoustic wave to travel the distance between said receivers, means coupled to said storage means for simultaneously recovering a plurality of said signals from said storage means at a later instant in time, and adding means coupled to said recovering means for determining the acoustic wave travel time over a distance in said formations corresponding to an integral multiple of the distance between said receivers.

2. An apparatus for measuring the travel time of acoustic waves in the earth formations surrounding a bore comprising a support adapted to be lowered into said bore, at least one acoustic wave transmitter and two acoustic wave receivers mounted in longitudinally spaced apart relation on said support, means connected to said transmitter for energizing said transmitter at equal depth intervals in said bore, said transmitter being adapted to generate an acoustic wave in said earth formations upon energization which reaches said receivers in succession, converter means connected to the output from each of said receivers for providing a signal which is representative of the time required for an acoustic wave to travel through said earth formations between said receivers, signal storage means, means coupled to said converter means for impressing a series of said signals on said signal storage means as said receivers are passed along the bore, readout means coupled to said storage means for simultaneously recovering from said storage means a plurality of said signals, and adding means coupled to said recovering means for determining the travel time of said acoustic waves over a distance in said earth formations which is at least as great as the span between said receivers.

3. An apparatus for measuring the travel time of acoustic waves in the earth formations surrounding a bore comprising a support adapted to be lowered into said bore, at least one acoustic wave transmitter and two acoustic wave receivers mounted in longitudinally spaced apart relation on said support, means connected to said transmitter for energizing said transmitter at equal depth intervals in said bore, said transmitter being adapted to generate an acoustic wave in said formations upon energization which reaches said receivers in succession, converter means connected to the output from each of said receivers for providing a signal which is representative of the time interval between the pulses generated by said receivers when an acoustic wave reaches said receivers in succession, signal storage means, means coupled to said converter means for impressing a series of said signals on said signal storage means, means coupled to said storage means for simultaneously recovering selected ones of said signals from said signal storage means and for adding said selected signals together, and means coupled to said recovering and adding means for indicating the travel time of said acoustic waves over a distance in said formations which is at least as great as the span between said receivers.

4. An apparatus for measuring the travel time of acoustic waves in the earth formations surrounding a bore comprising a support adapted to be lowered into said bore, at least one acoustic wave transmitter and two acoustic wave receivers mounted in longitudinally spaced apart relation on said support, means connected to said transmitter for energizing said transmitter at equal depth intervals in said bore, said transmitter being adapted to generate an acoustic wave in said earth formations upon energization which reaches said receivers in succession, first converter means connected to the outputs from said receivers for providing a signal characteristic of a number in binary form which is representative of the time interval between the pulses generated by said receivers when one of said acoustic waves reaches said receivers in succession, magnetic signal storage means, means coupled to said first converter means for impressing a series of said signals on said magnetic signal storage means, means coupled to said storage means for simultaneously recovering from said signal storage means selected ones of said signals, a plurality of second converter means coupled to said recovering means for providing outputs which are representative of said selected signals, and means coupled to said second converter means for adding said second converter outputs together and for indicating the travel time of said acoustic waves over a distance in said formations which is at least as great as the span between said receivers.

5. An apparatus for measuring the travel time of acoustic waves in the earth formations surrounding a bore as in claim 4 wherein said first converter means comprises a clock oscillator, a plurality of series connected flip-flop circuits, a gate coupled to said oscillator and said receivers adapted to pass pulses from said oscillator to said plurality of series connected flip-flop circuits only during the time interval between said pulses generated by said receivers, said flip-flop circuits being adapted to be successively energized by the pulses received from said clock oscillator, and a scanning switch connected to each of said flip-flop circuits for sensing the condition of each of said flip-flop circuits at the end of said time interval.

6. Apparatus for measuring the travel time of acoustic waves in the earth formations surrounding a bore as in claim 4 wherein said second converter means comprises a scanning switch connected to be responsive to said recovering means, a plurality of flip-flop circuits connected to said scanning switch and adapted to be selectively energized according to the number received by said scanning switch, and a decoding network coupled to said flip-flop circuits for providing a voltage which is representative of the condition of said plurality of flip-flop circuits.

7. An apparatus for measuring the travel time of acoustic waves in the earth formations surrounding a bore comprising a support adapted to be lowered into said bore, at least one acoustic wave transmitter and two acoustic wave receivers mounted in longitudinally spaced apart relation on said support, means connected to said transmitter for energizing said transmitter at equal depth intervals in said bore, said transmitter being adapted to generate an acoustic wave in said earth formations upon energization which reaches said receivers in succession, converter means connected to the outputs from said receivers for providing a voltage which is proportional to the time interval between the pulses generated by said receivers when an acoustic wave reaches said receivers, signal storage means comprising a plurality of capacitors mounted in insulated relation with respect to each other, means in said storage means for periodically connecting said capacitors together in series, means coupled to said converter means for connecting the outputs thereof across successive ones of said capacitors in series, means coupled to said storage means for indicating the total voltage to which a selected group of said capacitors are charged, and means in said storage means for discharging said capacitors.

8. An apparatus for measuring the travel time of acoustic waves in the earth formations surrounding a bore comprising a support adapted to be lowered into said bore, at least one acoustic wave transmitter and two acoustic wave receivers mounted in longitudinally spaced apart relation on said support, means connected to said transmitter for energizing said transmitter at equal depth intervals in said bore, said transmitter being adapted to generate an acoustic wave in said earth formations upon energization which reaches said receivers in succession, converter means connected to the outputs from said receivers for providing a voltage which is representative of the time interval between the pulses generated by said receivers when an acoustic wave reaches said receivers, capacitance type signal storage means, means coupled to said converter means for storing a series of said voltages on said storage means, means carried by said storage means for adding said stored voltages together in series, means coupled to said storage means for simultaneously recovering from said storage means a selected group of said voltages, and means coupled to said recovering means for determining the travel time of said waves over a distance in said formations corresponding to at least the span between said receivers as a function of said selected group of said voltages.

9. Apparatus for measuring acoustic wave travel time in earth formations surrounding a bore comprising, means for obtaining electrical indications at a plurality of successive levels in the bore of the time required for an acoustic wave to travel a predetermined distance through the earth formations, storage means coupled to said means coupled to said storage means for simultaneously recovering a plurality of said stored indications at a later instant in time, and means coupled to said readout means for adding said recovered indications together to obtain a measurement of the time required for said acoustic waves to travel a distance in said bore which is at least as great as said predetermined distance.

10. Apparatus for measuring the propagation times of waves in a medium comprising, a support adapted to be moved through said medium, wave generating and receiving means mounted in said support in fixed, spaced apart relationship, said receiving means being operative to provide an output signal representative of the propagation time of said waves through a predetermined distance in said medium, means for moving said support through said medium, means synchronized with said moving means for actuating said generating means to produce recurring bursts of waves, whereby said receiving means produces an output signal indicative of the propagation time of said waves through said predetermined distance in said medium for each of said bursts, signal storage means synchronized with said moving means to successively store said output signals, readout means coupled to said storage means to simultaneously recover said stored signals, and means selectively coupled to said readout means to sum any desired number of successively stored signals, whereby said summing means provides an indication of the propagation time of said wave through said medium a distance equal to or greater than said predetermined distance.

References Cited in the file of this patent

UNITED STATES PATENTS

| | | |
|---|---|---|
| 2,190,686 | Slichter | Feb. 20, 1940 |
| 2,704,364 | Summers | Mar. 15, 1955 |
| 2,708,485 | Vogel | May 17, 1955 |
| 2,836,359 | Mazzagatti | May 27, 1958 |
| 2,841,778 | Ball et al. | July 1, 1958 |
| 2,865,463 | Itria | Dec. 23, 1958 |
| 2,888,663 | Blake et al. | May 26, 1959 |
| 2,905,258 | Broding | Sept. 22, 1959 |
| 2,931,455 | Loofbourrow | Apr. 5, 1960 |

UNITED STATES PATENT OFFICE
CERTIFICATE OF CORRECTION

Patent No. 3,088,540

May 7, 1963

Frank P. Kokesh

It is hereby certified that error appears in the above numbered patent requiring correction and that the said Letters Patent should read as corrected below.

Column 10, line 8, after "means", second occurrence, insert -- for storing said electrical indications, readout means --.

Signed and sealed this 26th day of November 1963.

(SEAL)
Attest:

ERNEST W. SWIDER

Attesting Officer

EDWIN L. REYNOLDS

Acting Commissioner of Patents